COMPARING APPARATUS

Original Filed June 23, 1954

INVENTOR.
Theodore Shapin, Jr.
BY
Wolfe, Hubbard, Voit & Osann
Attys.

3,049,693
COMPARING APPARATUS

Theodore Shapin, Jr., 913 N. Lemon St., Anaheim, Calif.
Original application June 23, 1954, Ser. No. 438,841, now Patent No. 2,923,921, dated Feb. 2, 1960. Divided and this application June 5, 1959, Ser. No. 818,470
6 Claims. (Cl. 340—149)

This invention relates in general to comparing apparatus, and in particular to apparatus for comparing plural digit binary "words." Although not limited in its uses, the invention finds especially advantageous employment in automatic searching systems of the kind disclosed and claimed in my copending application Serial No. 438,841, filed June 23, 1954 (now Patent 2,923,921), and of which the present application is a division.

The general aim of the invention is to provide improved apparatus for comparing plural digit binary "words" or expressions, not to detect exact correspondence or identity, but to detect correspondence under a "superimposed" coding system. The significance and advantages of superimposed coding will be made clear below.

Another object of the invention is to provide such a comparator which may be conveniently and economically constructed of conventional circuit components.

Other objects and advantages will become apparent as the following description proceeds, taken in conjunction with the accompanying drawings, in which.

Figures 1, 2, 3, 4, 5:
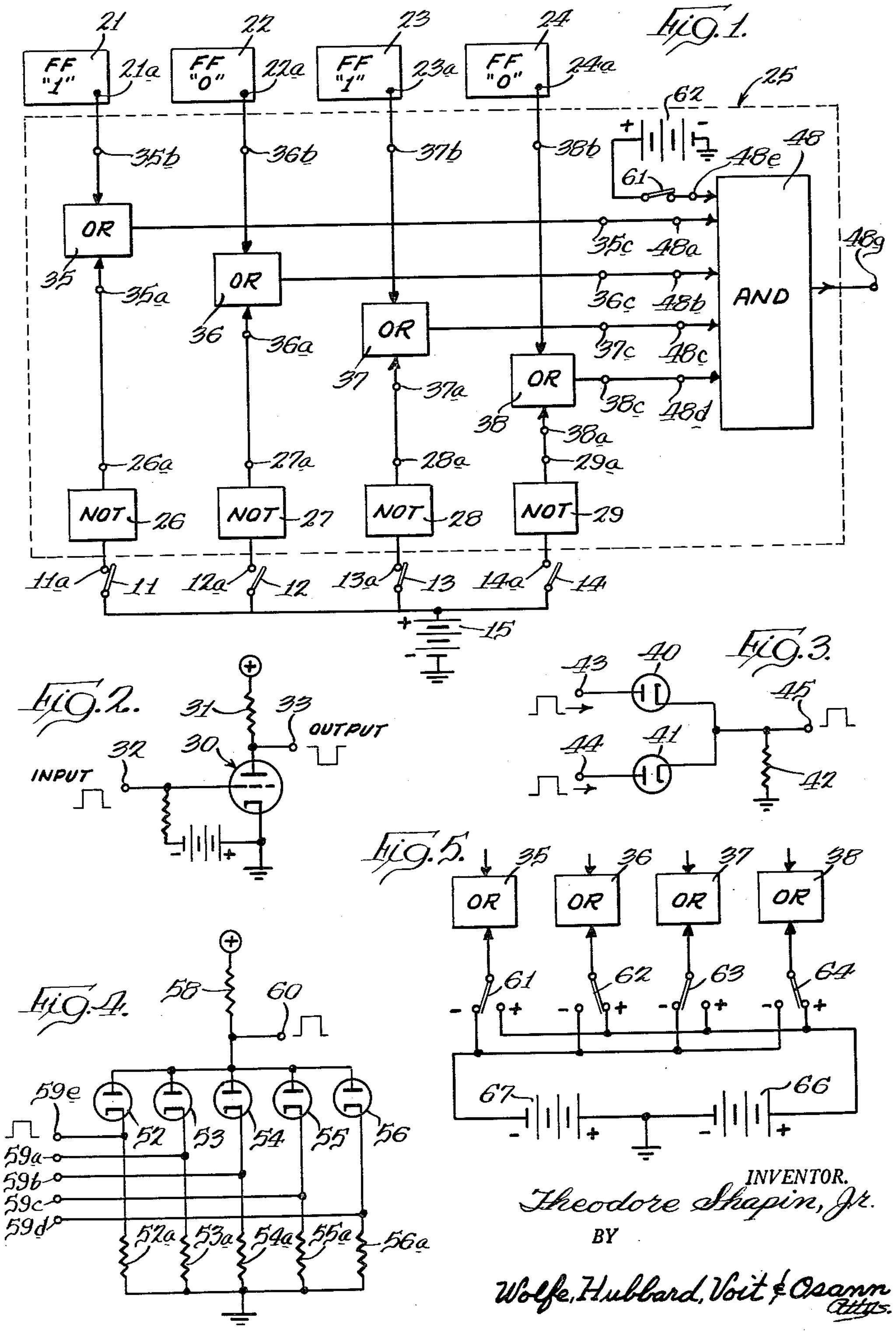
FIGURE 1 is a diagrammatic block-and-line illustration of a comparator embodying the features of the invention.
FIG. 2 is a more detailed illustration of an exemplary logical NOT device of the type shown in FIG. 1.
FIG. 3 is a more detailed illustration of an exemplary logical OR device of the type employed in FIG. 1.
FIG. 4 is a more detailed illustration of an exemplary logical AND device employed in FIG. 1.
FIG. 5 is a circuit diagram of a portion of a comparator, illustrating a modification over that form of the invention shown by FIG. 1.

While the invention has been shown and will be described in some detail with reference to particular embodiments thereof, there is no intention that it thus be limited to such detail. On the contrary, it is intended here to cover all modifications, alternative constructions and equivalents falling within the spirit and scope of the invention as defined by the appended claims.

Referring now to the drawings, the apparatus there shown functions to compare two plural-place binary words or expressions and to provide an output signal response when correspondence of such words occurs according to a superimposed coding system. By the term "binary" as used herein, I do not refer to a system of expressing numbers with a radix of 2, but on the contrary, I intend to indicate that each digit place in a word or expression may have either of two conditions or values, e.g., "on" or "off," "yes" or "no," "0" or "1." Whether or not the binary expressions which are compared by apparatus embodying the present invention constitute numerical expressions according to a straight binary system or coded binary system of numbers, is entirely immaterial.

As indicated above, each digit place of a binary code or expression may have one of two characteristics, such as the familiar "0" or "1" designation. These two characteristics or conditions for each digit place may be represented by the corresponding physical states of any of a wide variety of bi-state devices. For example, a switch when respectively opened or closed may represent a binary "0" or "1"; a relay which is picked up or dropped out may respectively represent a "1" or "0."

Further, the two binary values "0" or "1" may be electrically represented by two different voltage levels in electrical circuits. For example, a given electrical terminal when at zero volts may represent a binary "0" and when at some positive potential may represent a binary "1." This system of notation according to voltage levels is employed in the exemplary comparator shown in FIG. 1.

To represent the first binary word to be compared, a plurality of bi-state devices, here shown as switches 11–14, may each be set to either of their two states in order to represent any one of a large number of binary expressions. For example, with the switches 11 and 13 closed, and the switches 12 and 14 open, as illustrated, they represent the binary expression 1010. Of course, it is contemplated that any number of such bi-state elements or switches may be employed in order to represent a binary expression having a greater number of digit places.

When any of the switches 11–14 is closed, the corresponding one of the terminals **11*a*–14*a* is placed at a positive potential (relative to a reference potential here illustrated as ground) by a suitable voltage source or battery 15. Thus, when any of the switches 11–14 is opened, or closed, the potential of the corresponding output terminal 11*a*–14*a*** represents a binary "0" or "1," respectively.

In order to represent a second binary word by similar arrangement of bi-valued voltages, a plurality of bi-state devices, here shown as well known Eccles-Jordan flip-flop circuits 21–24, are employed. These flip-flop circuits may, for example, form a part of a shifting register or storage register in the manner more fully described in the above-identified copending application. It will suffice to note here simply that each of the flip-flop devices 21–24 may reside in either of two conductive states, and its corresponding output terminal **21*a*–24*a* will be placed at a relatively high or low potential, respectively, relative to ground. Thus, if the flip-flop devices 21 and 23 are in the "1" states, the terminals 21*a* and 23*a* will be positive in potential, and if the flip-flops 22 and 24 are in the "0" states, their terminals 22*a* and 24*a*** will reside at about zero volts potential relative to a reference or ground point.

In accordance with the invention, the comparator 25 (indicated generally within the dotted rectangle in FIG. 1) comprises a first means to represent the complement of the first binary word or expression. That is, means are provided to represent a binary word or expression which is in the "NOT" form of the first binary word or expression. For this purpose, a plurality of NOT devices 26–29 have their input terminals connected to the respective switch terminals **11*a*–14*a*. Each of the NOT circuits 26–29 has a corresponding output terminal 26*a*–29*a* which resides at a potential which is high or low depending upon whether the input potential appearing on the corresponding terminal 11*a*–14*a* is low or high, respectively. In other words, the NOT devices 26–29 convert each "0" or "1" represented on the terminals 11*a*–14*a* into "1" or "0" on the terminals 26*a*–29*a***, since "NOT 1" is "0" and "NOT 0" is "1."

An exemplary simple form of logical NOT device is shown in FIG. 2 comprising simply a triode electron discharge device 30 having its anode connected to a symbolically represented positive supply voltage through a load resistor 31. When an input terminal 32 is left unconnected, or connected to a point of ground potential (symbolizing a "0" input), the potential of an input terminal 33 is relatively high (symbolizing a binary "1"), since little or no current flows through the device 30 and resistor 31. A positive increase in the input potential applied to the input terminal 32 and the control grid of the triode 30 results in an increase in conduction by the latter and a corresponding reduction in the potential of the output terminal 33. Thus, when the input terminal 32 is at a high potential (symbolizing a binary "1"), the output terminal 33 is at a relatively low potential (symbolizing a binary "0").

While the switches 11–14 with the exemplary positions illustrated in FIG. 1 cause a first binary word 1010 to be represented on the terminals 11*a*–14*a*, the NOT circuits 26–29 make the terminals 26*a*–29*a* reside at potentials representing the complement of this word, i.e., 0101.

Further in keeping with the invention, means are provided for sensing the characteristics or values of each corresponding pair of digit places in the complement word and in the second binary word, such means providing a response if either of the two sensed digits is of a predetermined value or characteristic, e.g., contains a binary "1." Stated differently, each digit place of the binary word appearing on the terminals 26*a*–29*a* is compared with the corresponding digit place of the binary word appearing on the flip-flop terminals 21*a*–24*a*, and a response is generated if either one or both of each such pair of digit places contains a binary "1."

In accomplishing this, a plurality of logical OR devices 35–38 are respectively interconnected between corresponding ones of the NOT devices 26–29 and the flip-flops 21–24. As shown in FIG. 1, the OR devices 35–38 have first and second input terminals 35*a*–38*a* and 35*b*–38*b*, respectively. The first set of input terminals 35*a*–38*a* are connected to corresponding ones of the output terminals 26*a*–29*a* of the NOT devices. The second set of input terminals 35*b*–38*b* are connected respectively to the output terminals 21*a*–24*a* of the flip-flops 21–24. The OR devices 35–38 also have output terminals 35*c*–38*c*, respectively.

Briefly stated, each of the OR devices 35–38 operates to provide a binary "1" signal on its respective output terminal when either one or the other (or both) of its two inputs are binary "1's." Conversely, each of the OR devices produces a binary "0" on its respective output terminal when both inputs thereto are "0's." A very simple, exemplary form of such an OR device is shown in FIG. 3. It comprises two normally cut-off diodes or unidirectionally conductive devices 40, 41 having cathodes connected to ground, or a point of reference potential, through a common resistor 42. Two input terminals 43, 44 lead to the anodes of the respective diodes 40—41, and an output terminal 45 leads from the junction of the cathodes and the resistor 42. It will be seen that if both of the input terminals 43, 44 are at a relatively low or ground potential (representing binary "0's,"), then the output terminal 45 will also be at ground potential (representing a binary "0"). However, if either one of the input terminals 43, 44 is at a positive potential relative to ground (symbolizing a binary "1"), then the corresponding one of the diodes 40 or 41 will conduct current, creating a voltage drop across the resistor 42. Accordingly, the output terminal 45 will be placed at a relatively high potential, symbolizing a binary "1." Thus, the potential of the output terminal 45 represents a binary "1" when either one of the input terminals 43, 44 receives a binary "1."

Further in carrying out the invention, means are provided to produce a final output response when all of the OR devices simultaneously respond to their input signals, i.e., when all of the OR devices produce a binary "1" output. For this purpose, a logical AND device 48 has a plurality of input terminals 48*a*, 48*b*, 48*c*, 48*d* connected respectively to the output terminals 35*c*–38*c* of the OR devices 35–38. When all of these input terminals are placed at relatively high potentials, then a final output terminal 48*g* will be placed at a relatively high potential to signify that they two binary words being compared do correspond.

As is well known, the AND device 48 produces an output response upon its final output terminal 48*g* only when all of its input terminals 48*a*–48*d* are simultaneously receiving an input signal or binary "1" indication. An exemplary form of this AND device is illustrated in FIG. 4. It includes a plurality of unidirectionally conductive discharge devices or diodes 52–56 all connected in parallel. The cathodes of such diodes are connected to ground through individual resistors 52*a*–56*a*; and the anodes are all connected through a common load resistor 58 to a suitable positive voltage source, here symbolically shown. The several input terminals 59*a–e* lead to respective ones of the cathodes of the diodes 52–56, while an output terminal 60 is taken from the common connection of the resistor 58 with all of the diode anodes. The circuit parameters are chosen such that all of the diodes 52–56 are normally conductive, thereby drawing appreciable current through the load resistor 58 and maintaining the output terminal 60 at a relatively low potential, signifying a "0" or no final response. Each of the diodes 52–56 has sufficient current carrying capacity by itself to maintain the output terminal 60 at a low potential when that diode is conducting. If four of the input terminals 59*a*–59*e* receive positive voltage inputs, the diode corresponding to the other input terminal will remain conductive, and thus no positive output voltage will appear at the terminal 60. On the other hand, if relatively great positive potentials are supplied simultaneously to all of the input terminals 59*a–e*, additional current flows from these input terminals through the respective cathode resistors 52*a*–56*a*, thus creating increased voltage drop across these cathode resistors and driving the corresponding cathodes more positive in potential. This lowers the voltage drop across the diodes 52–56 and causes them to cease conduction. Accordingly, the output terminal 60 rises in potential to a value substantially equal to the supply voltage, that is, has a positive response.

As shown in FIG. 1, the fifth input terminal 48*e* for the AND device 48 is connected through a normally closed switch 61 to the positive terminal of a biasing source or battery 62. Thus, the terminal 48*e* is normally at a high potential representative of a binary "1." If, however, it is desired to delay the comparing action until all of the switches 11–14 have been set, or until the second binary word has been shifted into the flip-flops 21–24, the switch 61 may be opened. Under these circumstances, no comparing action will take place, that is, no output can be produced on the final terminal 48*g*, until the switch 61 is reclosed. In other words, the battery 62 and switch 61 constitute means to supply a potential representative of a "1" to the input terminal 48*e* to select the desired time instant when comparison of the two binary words represented by the states of the flip-flops 21–24 and the positions of the switches 11–14 is to be made.

The operation of the comparator of FIG. 1 will be clear from the foregoing description, although a brief summary will be helpful. With the switches 11–14 set in the positions illustrated, the NOT devices 27 and 14 both receive binary "0's" as their inputs. Thus, the potentials on the terminals 27*a* and 29*a* will be relatively high, symbolizing binary "1's." This means that the OR circuits 36 and 38 both receive binary "1" inputs on their terminals 36*a* and 38*a*, and will produce binary "1" potentials on their output terminals 36*c* and 38*c* regardless of the states of the flip-flops 22 and 24 and the potentials of the input terminals 36*b* and 38*b*.

With the switches 11 and 13 closed, however, the NOT devices 26 and 28 receive "1" inputs and thus produce "0" outputs on their terminals 26*a* and 28*a*. The OR devices 35 and 37, therefore, cannot provide output responses unless they receive binary "1" input signals on their terminals 35*b* and 37*b*. As illustrated by way of example in FIG. 1, flip-flops 21 and 23 are in the "1" states, so that their terminals 21*a* and 23*a* do supply high potentials indicative of binary "1's" to the input terminals **35*b* and 37*b*. This means that the OR devices 35 and 37 both provide binary "1" responses on their output terminals 35*c* and 37*c*. Therefore, all of the input terminals for the AND devices 48 receive binary "1" signals, and a positive output response will be produced on the final output terminal 48*g*. Thus, if the first binary word represented by the switches 11–14 is 1010 and the second binary word represented by the flip-flops 21–24 is 1010, the two words are alike and comparison thereof produces an indication of such identity, i.e., results in a positive potential on the output terminals 48*g***.

It will be noted, however, that the criterion for the production of a final response on the terminal **48*g* is that whenever a "1" appears in any digit place of the first word (represented by the switches 11–14) then a "1" must appear in the corresponding digit place of the second word (represented by the flip-flops 21–24). However, if a "0" appears in any digit place of the first word, then it is entirely immaterial whether a "0" or a "1" appears in the corresponding digit place of the second word. In other words, so long as the second word has a "1" in digit places which correspond to the digit places containing "1's" in the first word, a response indicative of correspondence between the two words will be produced on the output terminal 48*g***.

This unique operation, which does not require exact identity between the compared words in order to produce a final output response, enables the comparator to be employed in the detection of correspondence of binary words according to a superimposed coding system. For example, let it be assumed that the flip-flops 21–24 in FIG. 1 may be rapidly and successively set to represent different binary words which, according to a predetermined coding system, represent subject matter categories of different library entries. Let it be assumed further that the switches 11–14 may be manually set to represent the binary word for a particular category to be investigated or studied. Still further, assume that instead of only four switches and four flip-flops, as shown in FIG. 1, a greater number of these elements is employed so as to provide for the representation of binary words having more digit places.

With the foregoing in mind, and simply by way of example for purposes of explanation, it may be arbitrarily assumed that the codes in Table I, below, designate the indicated subject matter categories.

*Table I*

| Category | Basic Code |
|---|---|
| English Literature | 11100000 |
| Drama | 01110000 |
| Shaw | 00111000 |
| Horses | 00000111 |

If now three library entries respectively and exclusively pertain to English Literature, Drama and Shaw (having nothing whatever to do with the other subjects), these three entries would be given code words containing only the corresponding basic category code, as indicated by entries A, B, and C in Table II, infra.

*Table II*

| Entry | Categories | Code Word |
|---|---|---|
| A | English Literature | 11100000 |
| B | Drama | 01110000 |
| C | Shaw | 00111000 |
| D | Shaw and Drama | 01111000 |
| E | Shaw, Drama and English Literature | 11111000 |
| F | Horses | 00000111 |
| G | Horses and English Literature | 11100111 |

However, certain works by Shaw and pertaining to Drama could be coded so as to include both categories, as indicated by the binary word for entry D in Table II. It will be noted that the two basic codes for the two categories are "superimposed" in the single code word for entry D by providing a "1" in each digit place of the word required by either of the two basic codes. Moreover, certain other entries which have to do with all three categories, i.e., English Literature, Drama and Shaw, would be provided with a code word as shown by entry E in Table II. It will be seen that this code word has the three basic category codes superimposed therein.

Table II further illustrates that an entry F dealing only with the category of Horses may be represented by a code word containing only the basic code for Horses. An entry G pertaining both to Horses and English Literature would be represented by a superimposed code word.

Let it be assumed that the several binary expressions in the foregoing table are placed successively in some storage means (such as the flip-flops 21–24 of FIG. 1) so that "second words" are successively inserted into the comparing apparatus.

If now it is desired to select or produce responses for all code words which pertain to English Literature, the binary expression corresponding to that code would be set up on or represented by the switches 11–14. If this "first word" represented by the switches is made 11100000 so that it constitutes the basic code for the "English Literature" category, then a response will be produced on terminal **48*g* by the comparing apparatus when code words for entries A and E appear. In like manner, it will be seen that if the first word set up on the switches is 00111000, indicating that responses are desired for categories pertaining to Shaw, then responses will be produced when the code words for entries C, D or E in Table II are fed into the flip-flops 21–24**.

Similarly, if just works pertaining to the categories Drama are to be detected, the Drama basic code 01110000 is set up on the switches, and a response will be produced to the code words for entries B, D and E in Table II since each of these entries deals with Drama.

Still further, if it is desired to produce responses to code words designating the category Horses, then the code for Horses is set up on the switches, such code word being 00000111. The comparing apparatus would then produce responses indicating superimposed coded identity between the word set up by the switches and the code words for entries F and G in Table II.

If it were desired to select only works having to do both with Horses and English Literature, then the code word 11100111 would be set up on the switches, and a response would be produced only to the code word for entry G in Table II. In like manner, if it were desired to select only works pertaining to both the categories Shaw and Drama, then a code word 01111000 would be set up on the switches and a response would be produced by the comparing apparatus only when the latter received the code words for entries D and E in Table II, these being the only two that contain superimposed coding for the categories Shaw and Drama.

The foregoing explanation made with reference to specific examples is not intended to be limiting. It will be apparent to those skilled in this art that each code word representing a given library entry or the like may consist of a relatively great number of digit places, for example, forty. Such code word for a given library entry may contain the individual basic codes, superimposed as indicated above, for several different categories. Thus, whenever any one of these categories is being sought, e.g., its code is set up to constitute the first word represented by the switches of FIG. 1, that particular entry code word will result in a final response by the comparator. Thus, a large number of library entries may each be classified in a number of categories and a code word for each such entry provided to represent all such categories in a superimposed representation. All entries falling within any one category may readily be selected. Moreover, it is possible to limit the comparator responses only to entries which contain both of two particular categories simply by setting up a "superimposed" expression as the first word represented by the switches.

It will be seen from the foregoing example, that the present comparator will find a wide range of advantageous uses in searching systems, business data processing systems, and computers.

FIG. 5 illustrates a modification in the comparator which may be employed in lieu of the NOT devices of FIG. 1 to produce the complement of one of the two binary words to be compared. In the modified comparator of FIG. 5, a first plural digit binary word may have the digits thereof represented according to the positions of respective ones of a plurality of bi-state devices or switches 61–64. It is assumed arbitrarily that with its movable switch contact shifted to the right in FIG. 5, each such switch contact represents the binary digit value "0"; conversely, when a movable switch contact is shifted to the left, it is assumed that the switch represents the binary digit value "1." Thus, in setting up an exemplary word, 1010, the movable contacts of switches 61 and 63 are shifted to the left, while the contacts of switches 62 and 64 are shifted to the right. Physically, therefore, the switches 61–64 as shown in FIG. 5 represent a first binary word, namely, 1010.

In order to represent a complement of that binary word, however, the switches 61–64 are associated with an electrical circuit which makes the output voltage of each switch the complement of the binary digit value represented by its physical position. Keeping in mind the previously assumed notation, i.e., that a positive voltage represents a binary "1" and that a zero or negative voltage represents a binary "0," the left stationary contacts of the switches 61–64 are biased to a negative potential by a voltage source or battery 67, while the right stationary contacts of such switches are biased to a positive voltage by a battery 66. Thus, whenever the switch 61 is in a physical position to represent a binary "0," its movable contact is placed at an electrical potential representing a binary "1" and vice versa. This is true of the switches 62–64 also.

It will be apparent, therefore, that while the switches 61–64 are physically positioned to represent the binary word 1010 in FIG. 5, their output terminals are at low, high, low and high potentials, respectively, so that their electrical outputs represent the complement of the word, namely 0101. This complement word is fed to OR circuits 35–38 which correspond to those shown in FIG. 1. The remainder of components for the comparator of FIG. 5 are not shown since they may correspond to the arrangement of FIG. 1. The over-all operation of a comparator utilizing the modification shown in FIG. 5 is substantially the same as that described above in connection with FIG. 1.

I claim as my invention:

1. Comparing apparatus comprising first means for representing a first plural-place binary word in which each digit place has one of two characteristics designatable "0" or "1," second means for representing a second plural-place binary word in which each digit place has one of two characteristics designatable "0" or "1," third means responsive to said first means for representing the complement word of said first binary word, and fourth means responsive to said second and third means for signaling when at least one of each pair of corresponding digit places in said second word and said complement word is a "1."

2. Comparing apparatus comprising first means for representing a first plural-place binary word in which each digit place has one of two characteristics designatable "0" or "1," second means for representing a second plural-place binary word in which each digit place has one of two characteristics designatable "0" or "1," third means responsive to said first means for representing the complement word of said first binary word, a plurality of sensing devices each corresponding to one digit place and connected to sense the representations in the two corresponding digit places of said second word and said complement word, each of said sensing devices having means for responding when either of the digit places it senses has a "1" characteristic, and means for producing a final output response when all of said sensing devices are responding, thereby to signal identity of said first and second words according to a superimposed coding system.

3. Apparatus for signalling superimposed correspondence of first and second plural-place binary words having either "1's" or "0's" represented in each digit place thereof, such apparatus comprising, in combination, a plurality of NOT devices respectively responsive to the representations in the digit places of said first word, a plurality of OR devices each having first and second inputs and an output, means supplying said first inputs with the respective outputs of said NOT devices, means supplying said second inputs with the representations in the respective corresponding digit places of said second word, and an AND device having as its plural inputs the said outputs of said OR devices.

4. Apparatus for comparing first and second plural-place binary words in which "1" or "0" values of each digit place are electrically represented by relatively high or low signals, said apparatus comprising a plurality of NOT circuits connected to receive the signals for respective ones of the digit places in said first word, a corresponding plurality of OR circuits each having two inputs the first of which are connected to receive the outputs of respective ones of said NOT circuits, and the second of which are connected to receive the signals for respective ones of the digit places in said second word, and an AND circuit having a plurality of inputs connected to receive the outputs of respective ones of said OR circuits, so that the AND circuits provides a response signal whenever there is a "1" in each digit place of the second word corresponding to digit places in the first word which contain a "1."

5. A comparator for detecting superimposed identity of first and second plural-place binary words in which the significant "1" or "0" values of each digit place are electrically represented by relatively high and low voltage potentials, said comparator comprising a plurality of voltage-inverting NOT circuits having input terminals connected to receive the potentials for the respective digit places in said first word, a corresponding plurality of OR circuits each having two input terminals and an output terminal which assumes a potential representative of "1" only if either or both of the input terminals receives a potential representative of "1," means connecting one of the input terminals of each said OR circuits to receive the output of a corresponding one of said NOT circuits, means connecting the other of said input terminals of each said OR circuit to receive the potential for the corresponding digit place in said second word, and an AND circuit having a plurality of input terminals connected respectively to the output terminals of said OR circuits, so that the AND circuit provides a response whenever the second word contains a "1" in each digit place corresponding to the "1's" in the first word.

6. The comparator set forth in claim 4 further characterized in that said AND circuit has one more input terminal than the number of said OR circuits, and including means to supply a potential representative of a "1" to said one input terminal at the time when comparison of the two binary words is desired.

References Cited in the file of this patent

UNITED STATES PATENTS

| | | |
|---|---|---|
| 2,512,038 | Potts | Jan. 20, 1950 |
| 2,609,143 | Stibitz | Sept. 2, 1952 |
| 2,900,620 | Johnson | Aug. 18, 1959 |